UNITED STATES PATENT OFFICE.

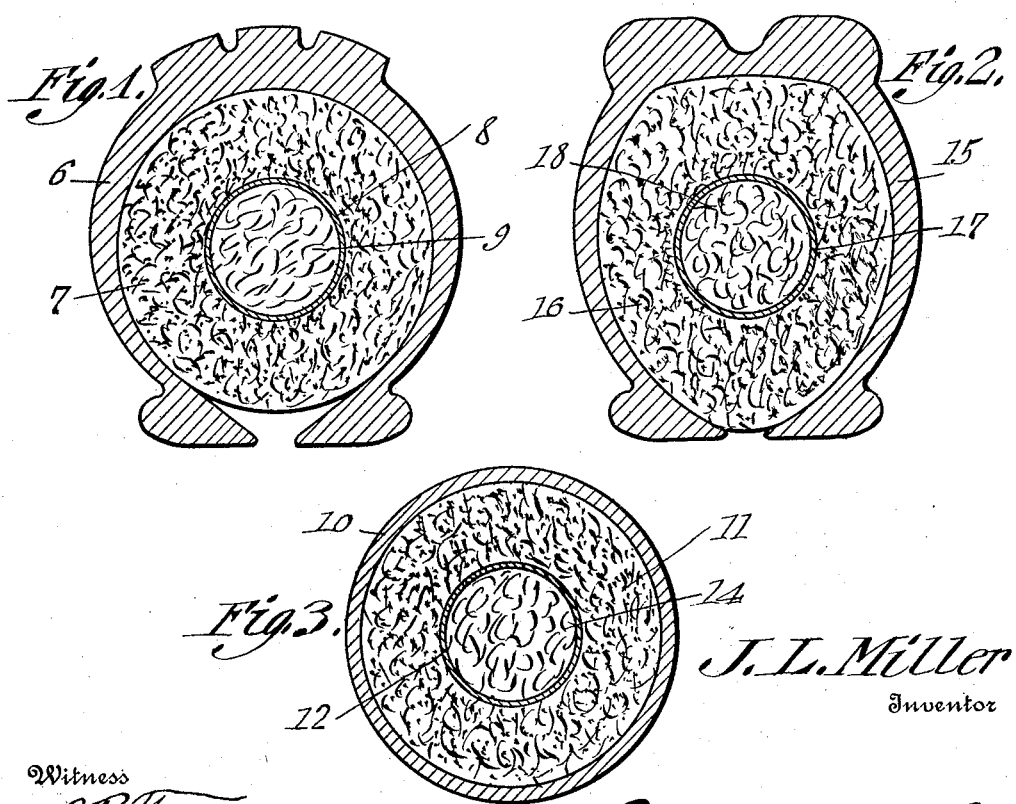

JOHN L. MILLER, OF FORT COLLINS, COLORADO.

AUTOMOBILE-TIRE.

1,318,575.      Specification of Letters Patent.     Patented Oct. 14, 1919.

Application filed June 17, 1918. Serial No. 240,364.

*To all whom it may concern:*

Be it known that I, JOHN L. MILLER, a citizen of the United States, residing at Fort Collins, in the county of Larimer and State of Colorado, have invented a new and useful Automobile-Tire, of which the following is a specification.

It is the object of this invention to provide a filler for a vehicle tire, which will not be subject to damage by puncture, the filler having, nevertheless, the desired resiliency, the constituent material of the filler being of such a nature that it will not pack into a hard, unyielding mass. Specifically, the invention contemplates the use of feathers in the making of a tire filler, a part of the feathers being united by a resilient binder, which may be rubber, rubber cement or the like. In this connection, it is to be noted that the body formed by the feathers and the binder is not a compact mass having the characteristics of rubber, with shreds of material therein, but, rather, is a porous mass having the characteristics of feathers, with enough of the resilient binder to hold the feathers together in a sponge-like mass. The proportions of the feathers and the binder may be fixed as desired. The more feathers there are in the mixture, the more sponge-like will the resulting product be: and as the proportion of rubber is increased, the stronger and more solid will be the resulting structure. The feathers ordinarily are shredded, and I prefer to remove the rib from each feather, although this is not insisted upon. If the rib is removed, the filler will contain no hard pieces resulting from the shredding of the rib.

The invention is disclosed in the drawings in three figures, each of which is a cross section, each figure showing a form differing from the forms shown in the other figures.

Passing to Figure 1, the numeral 6 denotes a tire casing inclosing a filler comprising a body 7 made of feathers and a binder as above described. The body 7 is fashioned about a flexible tube 8 which may be made of canvas or other suitable material. The tube 8 contains a core 9 consisting of dry shredded feathers, packed as closely as occasion may demand. By "dry" I mean, above and in claiming my invention, that the feathers are not united by a binder, but are merely packed more or less closely, in a shredded condition in the tube.

The form of the invention which is disclosed in Fig. 1 is adapted to be used on touring cars and light vehicles. In Fig. 2 there is shown a truck tire comprising a casing 15, containing a body 16, made of feathers and a binder, a flexible tube 17, and a core 18 of dry feathers.

In Fig. 3, the invention is embodied in a form which may be used on a bicycle or motor-cycle, there being a tubular casing 10 disclosed, the casing containing a body 11 made of feathers and a binder, the body inclosing a flexible tube 12 having a core 14 of dry feathers.

Shredded feathers are peculiarly efficient in making a tire filler, because they will not pack, feathers having, nevertheless, the desired resiliency. Especially, when the filler includes a porous feather and binder body, a flexible tube in the body, and dry feathers in the tube, an unusually satisfactory filler results.

Having thus described the invention, what is claimed is—

1. A tire filler comprising feathers united by a resilient binder to form a body; and a core of dry feathers in the body.

2. A tire filler comprising feathers united by a resilient binder to form a body; a flexible tube in the body; and dry feathers in the tube.

3. A tire filler comprising feathers united by a resilient binder to form a porous body; and a core of dry feathers in the body.

4. A tire filler comprising feathers united by a resilient binder to form a porous body; a flexible tube in the body; and dry feathers in the tube.

In testimony that I claim the foregoing as my own, I have hereto affixed my signature.

JOHN L. MILLER.

Copies of this patent may be obtained for five cents each, by addressing the "Commissioner of Patents, Washington, D. C."